(No Model.)

M. E. CAMPFIELD.
ART OF MAKING THE SCREW AND HEAD FOR WRENCHES.

No. 303,385. Patented Aug. 12, 1884.

Witnesses,

Inventor,
Matthew E. Campfield,
per Geo. W. Tibbitts
Attorney.

UNITED STATES PATENT OFFICE.

MATTHEW E. CAMPFIELD, OF CLEVELAND, OHIO.

ART OF MAKING THE SCREW AND HEAD FOR WRENCHES.

SPECIFICATION forming part of Letters Patent No. 303,385, dated August 12, 1884.

Application filed January 9, 1884. (No model.)

*To all whom it may concern:*

Be it known that I, MATTHEW E. CAMPFIELD, of Cleveland, in the county of Cuyahoga and State of Ohio, have invented certain new and useful Improvements in the Art of Making the Screw and Head for Wrenches, of which the following is a specification.

This improvement relates to the operating-screw in the monkey-wrench for which a patent was granted to me the 9th day of May, 1882; and it consists in the peculiar method of constructing the screw and the head for rotating it.

The object of the invention is to render the manufacture of these screws in a perfect and true form and at greatly reduced cost and labor.

Figure 1:
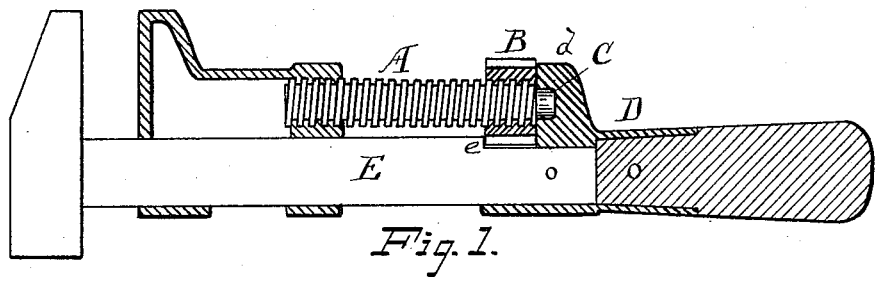
Figures 2, 3:
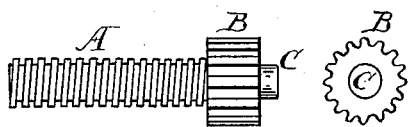
Figure 4:
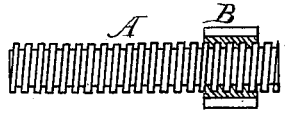
Figure 5:

In the accompanying drawings, Figure 1 is a longitudinal section of a wrench embodying my improvement. Fig. 2 is a detached view of the screw. Fig. 3 is an end view of the same. Fig. 4 shows screw with head before being milled down. Fig. 5 shows long piece of screw-threaded metal from which the said short screws are severed.

In constructing this screw I first cut a screw-thread onto a long piece of metal and then cut the piece up into lengths sufficient for the wrench. I next make a head for these screws somewhat resembling a gear-pinion, cutting a screw-thread in it which fits tightly onto the screw, and then force the head thereon, leaving a short portion of the screw projecting after the head is put on, which may be milled down, cutting off the thread, making a journal to fit in a recess in a projection of the ferrule.

A is the screw, on which the head B is firmly forced. C is the journal fitting in recess in projection $d$ of the ferrule D. The head B rotates against the projection $d$ on one side, and against a shoulder, $e$, on the shank E. In thus constructing and applying the screw a perfectly true and evenly-cut thread up to the head is obtained, and the production of the screws is greatly facilitated at reduced cost of labor and expense.

Having described my invention, I claim—

The herein-described improvement in the art of constructing screws for monkey-wrenches, consisting in cutting the screw-thread on a long piece, and then cutting said piece into suitable lengths, and then forcing thereon a threaded and corrugated head, and milling down a short portion of the screw to form the journal, as and for the purpose specified.

MATTHEW E. CAMPFIELD.

Witnesses:
 GEO. W. TIBBITTS,
 M. G. NORTON.